(12) United States Patent
Vivanco

(10) Patent No.: US 9,179,360 B1
(45) Date of Patent: Nov. 3, 2015

(54) FORWARD ERROR CORRECTION AND RETRANSMISSIONS FOR MEDIA SERVICE OPTIMIZATION OVER A WIRELESS COMMUNICATION NETWORK

(71) Applicant: Sprint Communications Company L.P., Overland Park, KS (US)

(72) Inventor: Daniel A. Vivanco, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 316 days.

(21) Appl. No.: 13/922,913

(22) Filed: Jun. 20, 2013

(51) Int. Cl.
*H04W 28/04* (2009.01)

(52) U.S. Cl.
CPC ..................................... *H04W 28/04* (2013.01)

(58) Field of Classification Search
None
See application file for complete search history.

(56) References Cited

U.S. PATENT DOCUMENTS

| | | | |
|---|---|---|---|
| 8,181,080 B2 | 5/2012 | Jugl et al. | |
| 8,254,441 B2 | 8/2012 | Sun | |
| 8,738,983 B2 * | 5/2014 | Gerstenberger et al. | 714/749 |
| 2008/0170528 A1 * | 7/2008 | Bosch et al. | 370/312 |
| 2009/0290559 A1 | 11/2009 | Pelletier et al. | |
| 2010/0223533 A1 | 9/2010 | Stockhammer et al. | |
| 2010/0263007 A1 | 10/2010 | Zhang et al. | |
| 2011/0004797 A1 | 1/2011 | Gerstenberger et al. | |
| 2011/0161771 A1 | 6/2011 | Zheng et al. | |
| 2012/0026963 A1 | 2/2012 | Kim et al. | |
| 2012/0047201 A1 | 2/2012 | Jain | |
| 2012/0201121 A1 | 8/2012 | Huang et al. | |
| 2015/0009930 A1 * | 1/2015 | Rapaport et al. | 370/329 |

* cited by examiner

*Primary Examiner* — Ian N Moore
*Assistant Examiner* — Brian T Le

(57) ABSTRACT

A wireless communication system optimizes media services over a wireless network. The wireless communication system is HARQ enabled. The wireless communication system receives the number of HARQ retransmissions, communication status data, configuration data, and flow identifications (IDs) for media flows that use FEC packets. The wireless communication system determines if the communication status data exceeds a system status threshold. If the communication status data exceeds the system status threshold, then the wireless communication system adjusts the number of HARQ retransmissions.

20 Claims, 7 Drawing Sheets

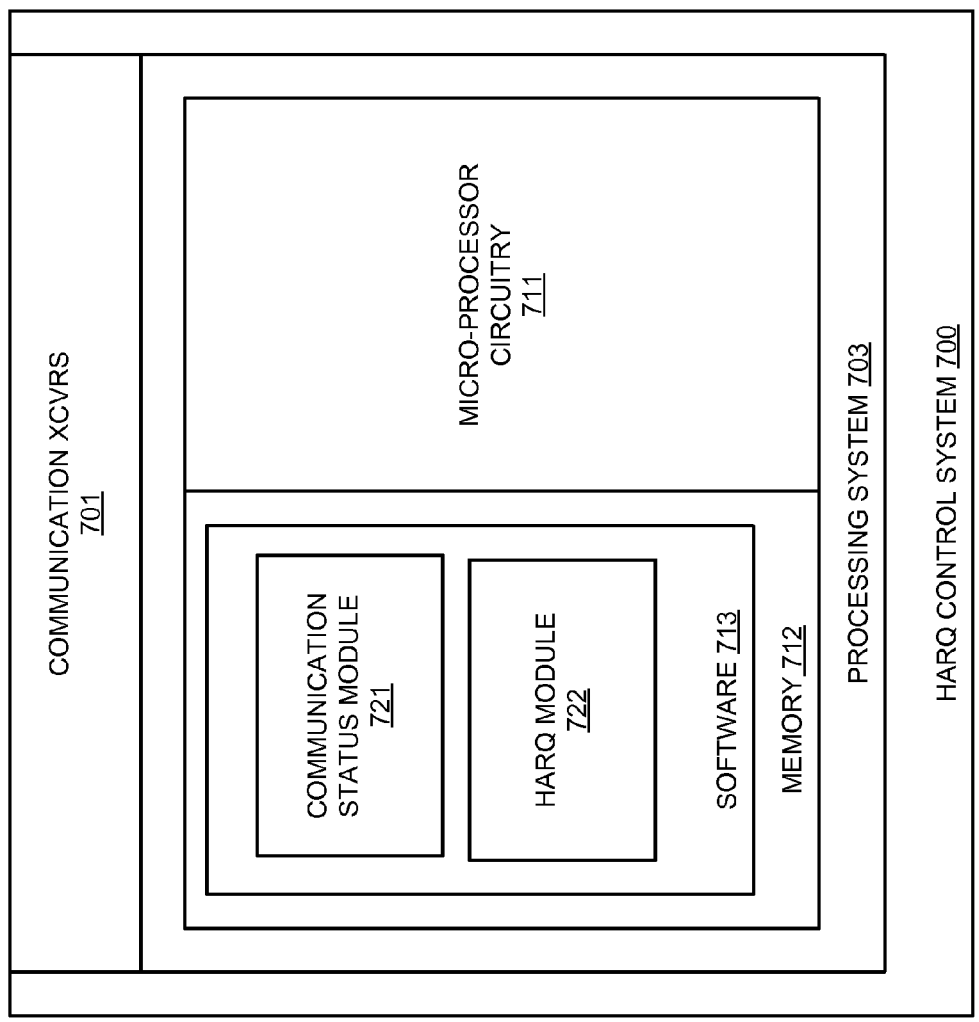

FORWARD ERROR CORRECTION AND RETRANSMISSIONS FOR MEDIA SERVICE OPTIMIZATION OVER A WIRELESS COMMUNICATION NETWORK

TECHNICAL BACKGROUND

Wireless communication devices communicate with wireless networks using wireless protocols, such as Long Term Evolution (LTE), Evolution Data Optimized (EVDO), High Speed Packet Access (HSPA), and the like. Transmissions over wireless networks can result in lost or corrupted data. One technique to recover lost or corrupted data is Forward Error Correction (FEC). FEC works by encoding and transmitting supplemental data in addition to the original file. FEC allows the receiver to reconstruct missing or corrupted data using the supplemental data.

Another technique to recover lost or corrupted data is retransmission. Automatic Repeat Request (ARQ) automatically retransmits packets when the receiver detects lost or corrupted data. Hybrid ARQ (HARQ) adds FEC capability to ARQ. Thus, the receiver may be able to recover lost or corrupted data using the FEC information before retransmission is invoked.

The demand for wireless communications is growing with respect to coverage and capacity. Newer data applications, such as video streaming and music downloads, have become popular features for wireless communication devices. The transmission of multimedia content consumes more network bandwidth compared to voice calls and text messages. The number of users also affects network capacity. The increase in the transmission of multimedia content, in addition to the increase in the number of users may result in network congestion. Network congestion may lead to dropped packets and retransmission attempts, further congesting the network.

TECHNICAL OVERVIEW

A wireless communication system optimizes media services over a wireless network. The wireless communication system is HARQ enabled. The wireless communication system receives the number of HARQ retransmissions, communication status data, configuration data, and flow identifications (IDs) for media flows that use FEC packets. The wireless communication system determines if the communication status data exceeds a system status threshold. If the communication status data exceeds the system status threshold, then the wireless communication system adjusts the number of HARQ retransmissions.

DESCRIPTION OF THE DRAWINGS

FIG. 7 illustrates an example of the HARQ control system shown in FIGS. 1, and 3-4.

DETAILED DESCRIPTION

Figure 1:
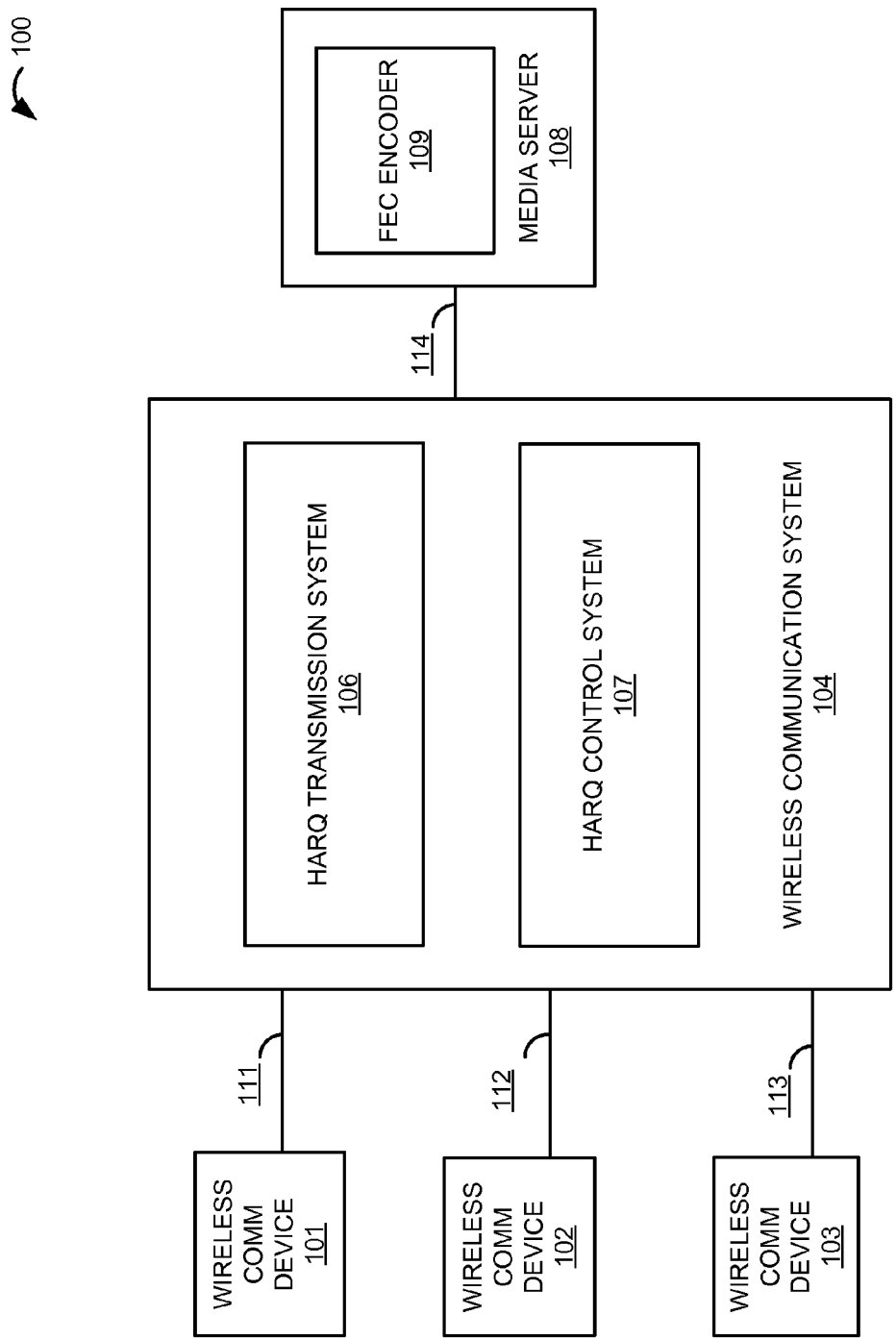
FIG. 1 illustrates a wireless communication system to optimize media services over a wireless network.

FIG. 1 illustrates a communication environment 100. Communication environment 100 comprises: wireless communication devices 101-103, wireless communication system 104, media server 108, and communication links 111-114. Wireless communication system 104 comprises HARQ transmission system 106 and HARQ control system 107. Media server 108 includes FEC encoder 109.

Media server 108 uses FEC encoder 109 to transfer media flows to wireless communication devices 101-103 over wireless communication system 104. These media flows transport voice, music, video, games, or some other type of media content. The individual media flows are identified by flow IDs that comprise packet addresses, routing codes, or some other identifying information. In some cases, the flow IDs indicate the identities of wireless communication devices 101-103. Wireless communication system 104 receives the flow IDs for the media flows from media server 108. These flow IDs may be explicitly indicated by media server 108 or they may be derived from the media flows by wireless communication system 104.

FEC encoder 109 adds supplemental FEC data packets to the media flows. The supplemental data packets can be used by wireless communication devices 101-103 to regenerate any missing or corrupted media data. For example, FEC encoder 109 may employ Raptor encoding that breaks media content into source packets (L) and adds "repair" packets (n) to the media flows, where the repair packets are used by wireless communication devices 101-103 to regenerate any missing or corrupted media data. The repair packets may be transmitted at the beginning or end of the media flows or may be transmitted in between the source packets.

Wireless communication system 104 is also HARQ enabled. When wireless communication system 104 fails to receive an acknowledgment message or a retransmission is requested, the data packet is automatically retransmitted.

Wireless communication system 104 may become congested for various reasons. For example, too many user devices may simultaneously download too much media data. In another example, a network component or link may fail and significantly reduce the available bandwidth. HARQ control system 107 receives the communication status data for wireless communication system 104 that indicates network congestion. The communication status data may comprise: the average number of retransmissions, the number of unsuccessfully decoded retransmitted packets, user numbers, signal levels, noise levels, packet drop rates, bandwidth usage, CPU utilization, control channel occupancy, and/or some other network usage metric.

HARQ control system 107 also receives configuration data for the flow IDs. The configuration data may comprise: media coding types, user Quality of Service (QoS) values, repair packet-to-source packet (n/L) ratios, device type, network type, and/or some other media flow information. HARQ control system 107 determines if the communication status data exceeds a system status threshold. The term "threshold" herein is representative and may include a sub-set of related sub-thresholds. If the communication status data exceeds the system status threshold for wireless communication system 104, then HARQ control system 107 adjusts the number of HARQ retransmissions per flow ID and transfers the number of HARQ retransmissions to HARQ transmission system 106.

HARQ control system 107 sets the number of HARQ retransmissions per flow ID. HARQ transmission system 106 then transmits data packets to wireless communication devices 101-103 for the media flows. HARQ transmission system 106 retransmits data packets up to the number of HARQ retransmissions as set by HARQ control system 107.

Figure 2:
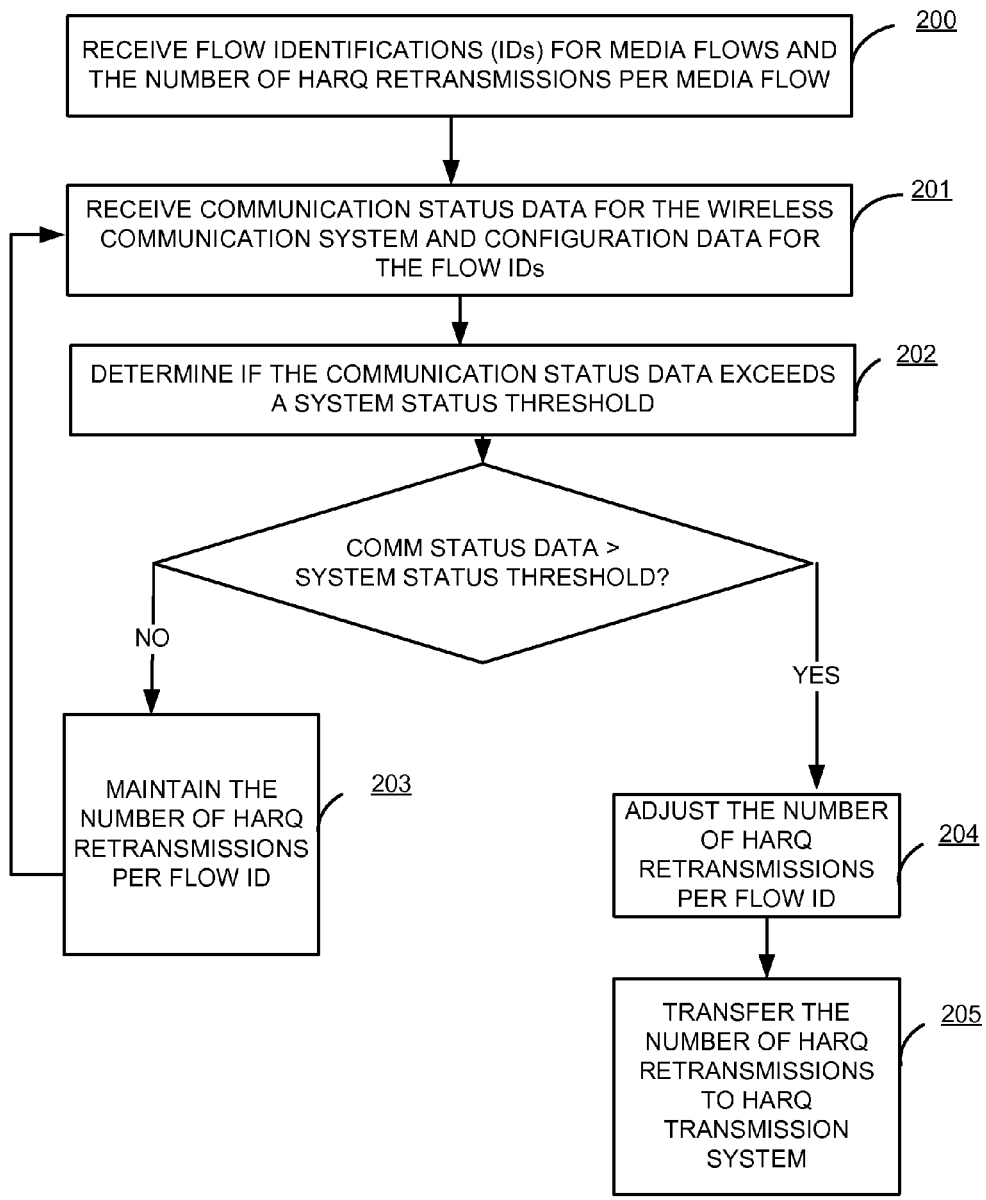
FIG. 2 illustrates the operation of a wireless communication network to optimize media services over a wireless network.

FIG. 2 illustrates the operation of wireless communication system 104 to optimize media services over a wireless network. Wireless communication system 104 receives flow IDs for media flows from media server 108 to wireless communication devices 101-103 (200). The flow IDs comprise packet addresses, routing codes, or some other identifying information. Wireless communication system 104 also receives the default number of HARQ retransmissions (200). HARQ control system 107 receives the communication status data for wireless communication system 104 and the configuration data for the flow IDs (201). The communication status data comprises user numbers, signal levels, noise levels, packet drop rates, bandwidth usage, CPU utilization, control channel occupancy, bit rate, network type, or some other network metric. The configuration data comprises user QoS value, media coding type, repair packet-to-source packet ratio, or some other media flow information.

HARQ control system 107 determines if the communication status data exceeds the system status threshold (202). For example, HARQ control system 107 may determine: 1) if noise levels at the wireless access node exceeds a predetermined amount, 2) if user numbers served by the wireless access node exceeds a predetermined amount, and/or 3) if backhaul link usage exceeds a predetermined amount. If the communication status data does not exceed the system status threshold, then HARQ control system 107 maintains the default number of HARQ retransmissions (203). If the communication status data exceeds the system status threshold, then HARQ control system 107 adjusts the number of HARQ retransmission per flow ID (204) and transfers the number of HARQ retransmissions per flow ID to HARQ transmission system 106 (205).

The adjustment could entail increasing or decreasing the number of HARQ retransmissions. For example, decreasing the number of HARQ retransmissions typically reduces noise and interference. In other examples, increasing the number of HARQ retransmissions lowers packet drops. Note that the number of HARQ retransmissions may remain the same for some users while it is adjusted for other users.

HARQ transmission system 106 receives the number of HARQ retransmission per flow ID from HARQ control system 107. HARQ transmission system 106 identifies each data packet by flow ID and transfers the data packet to the requesting wireless device. In the event a data packet requires retransmission, HARQ transmission system 106 will attempt to retransmit the data packet up to the number of HARQ retransmissions.

Figure 3:
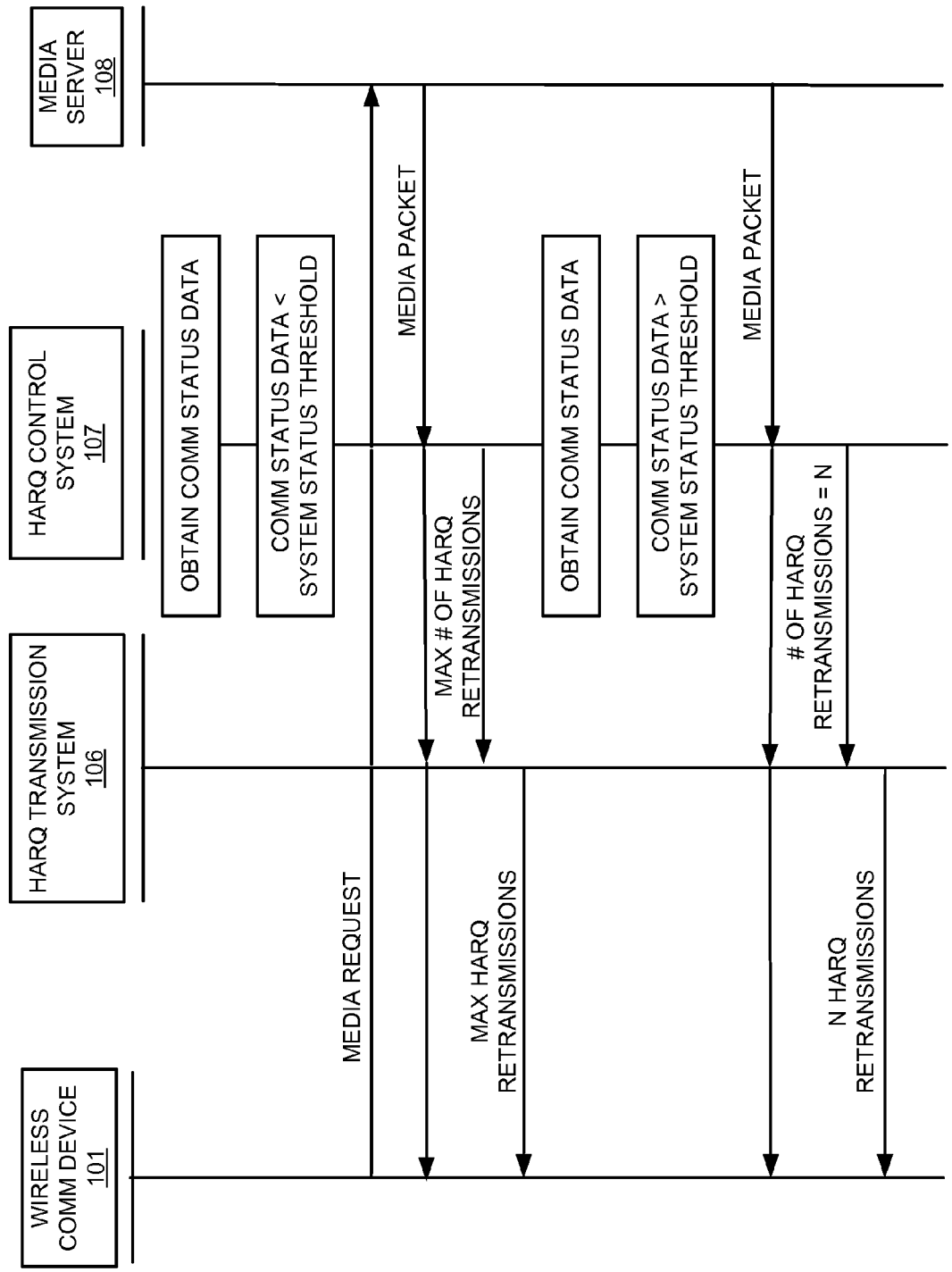
FIG. 3 illustrates a wireless communication system to optimize media services over a wireless network.

FIG. 3 illustrates the operation of wireless communication system 104. HARQ control system 107 receives communication status data and determines that the system status threshold has not been met or exceeded. Thus, maximum HARQ retries are allowed. Contemporaneously, wireless device 101 requests media from media server 108, and media server 108 transfers a media packet for delivery to wireless communication device 101. HARQ control system 107 receives the media packet and forwards the media packet to HARQ transmission system 106 along with the number of HARQ retransmissions which is set to the maximum number given current system conditions. HARQ transmission system 106 transfers the media packet for delivery to wireless communication device 101. HARQ transmission system 106 will use the maximum number of HARQ retries to deliver the packet if negative acknowledgements are received from wireless communication device 101.

HARQ control system 107 receives additional communication status data and determines that the system status threshold has now been exceeded. Thus, HARQ retries will be limited to a number N that is lower than the maximum. Contemporaneously, wireless communication device 101 requests more media from media server 108, and media server 108 transfers another media packet for delivery to wireless communication device 101. HARQ control system 107 receives the media packet and forwards the media packet to HARQ transmission system 106 along with the number (N) of HARQ retransmissions which is now lower than the maximum number allowed given current system conditions. HARQ transmission system 106 transfers the media packet for delivery to wireless communication device 101. HARQ transmission system 106 will use N number of HARQ retries to deliver the packet if negative acknowledgements are received from wireless communication device 101.

Figure 4:
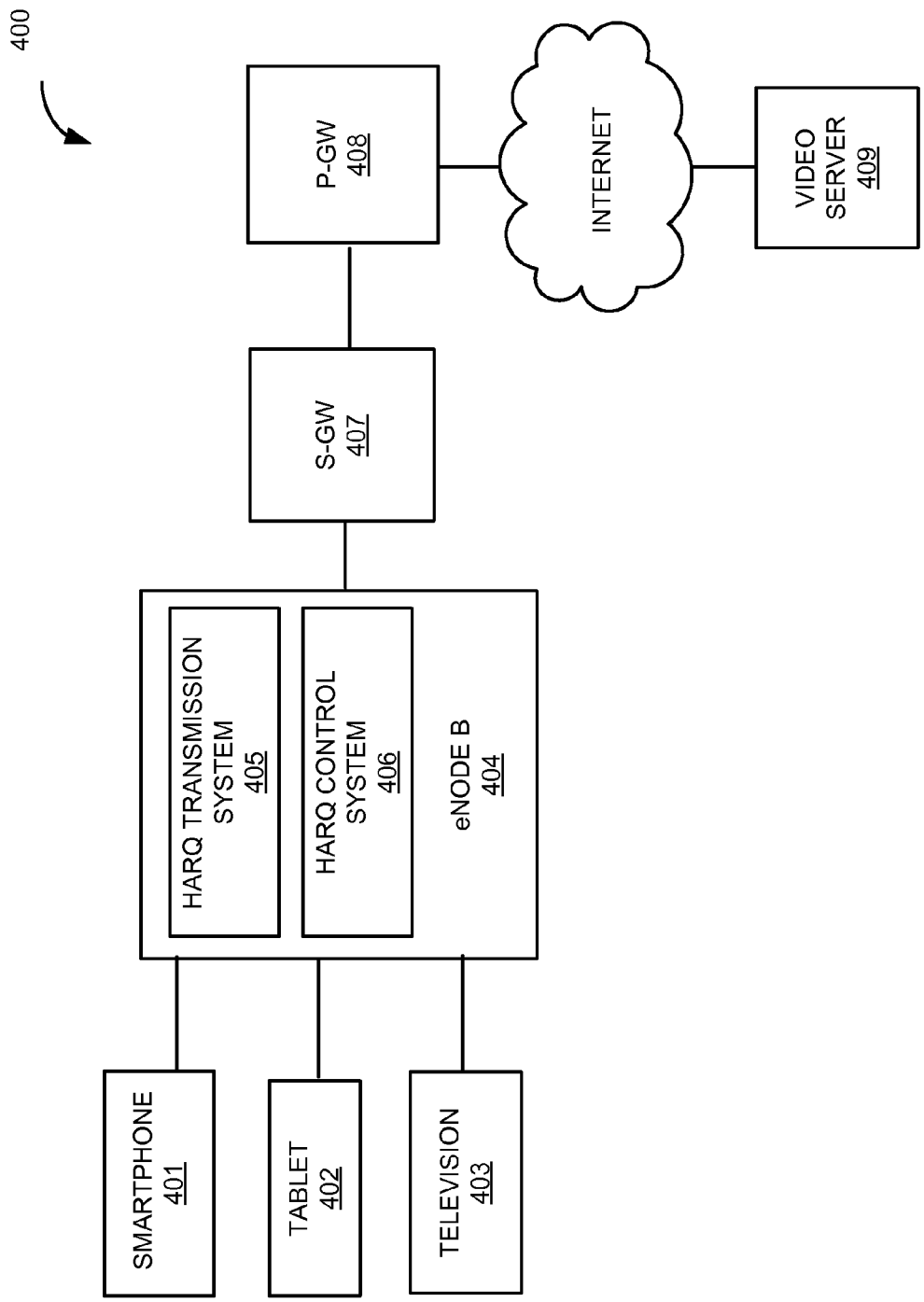
FIG. 4 illustrates an LTE wireless communication system that optimizes media services over the wireless network.

FIG. 4 is a block diagram that illustrates wireless communication environment 400 in an exemplary embodiment. Long Term Evolution (LTE) wireless communication environment 400 provides an example of wireless communication environment 100, although wireless communication environment 100 may use alternative configurations and operations. LTE wireless communication environment 400 comprises LTE communication devices 401-403 (a smartphone, tablet, and television), eNodeB 404, S-GW 407, P-GW 408, and video server 409. eNodeB 404 includes HARQ transmission system 405 and HARQ control system 406. Although HARQ transmission system 405 and HARQ control system 406 are shown in eNodeB 404 on FIG. 4, HARQ control system 406 may be alternatively located in, S-GW 407, P-GW 408 or some other network element or may be distributed across eNodeB 404 and P-GW 408.

Each media flow has a set number of HARQ retransmissions, which may be the same for all media flows or may vary based on media flow ID. Each data packet in a flow is allowed the set number of HARQ retransmissions for that flow. Typically, the number of HARQ retransmission is set to the maximum number for all media flows and is reduced as noise and interference increases.

Thus as the network becomes more congested, it may be necessary to reduce the number of HARQ retransmissions. HARQ control system 406 determines whether the communication status data exceeds a system status threshold. If the communication status data exceeds a system status threshold, then HARQ control system 406 adjusts the number of HARQ retransmissions on a per flow basis.

The number of HARQ retransmissions may be adjusted based on various factors, such as the average number of retransmissions used, number of unsuccessfully decoded retransmissions, packet drop rate, user QoS, media coding type, repair packet (n) to source packet (L) ratio (n/L), bit rate, or some other communication variable. Packet drop rates indicate the number of packets that are dropped per media flow.

User QoS indicates the level of service associated with the user's wireless devices, and high-QoS users may be protected from loss of FEC data by increasing or maintaining the HARQ retransmissions allowed for the media flows. When the user QoS is high, there is greater need to ensure delivery of data packets to maintain premium services. Thus, a user with a high QoS may have their number of allowed retransmissions maintained or adjusted upwards when noise levels cause a reduction in the number of HARQ retransmissions for other users.

Media coding type refers to the modulation and coding scheme used to transmit the requested media. Different media coding types are more reliable than others with respect to packet drops. If the user has a low-reliability media coding type, there is a greater need for repair packets and retransmissions. Thus, a user with a low-reliability coding type may have their number of HARQ retransmissions adjusted upwards when noise levels cause a reduction in the number of HARQ retransmissions for other users.

The ratio (n/L) of the number of repair packets (n) to the number of source packets (L) is set by video server 408. A small n/L ratio (i.e. a small number of repair packets) may result in a failure to recover the lost or corrupted source data. Thus, a user with a small n/L ratio may have their number of HARQ retransmissions adjusted upwards when noise levels cause a reduction in the number of HARQ retransmissions for other users.

Figure 5:
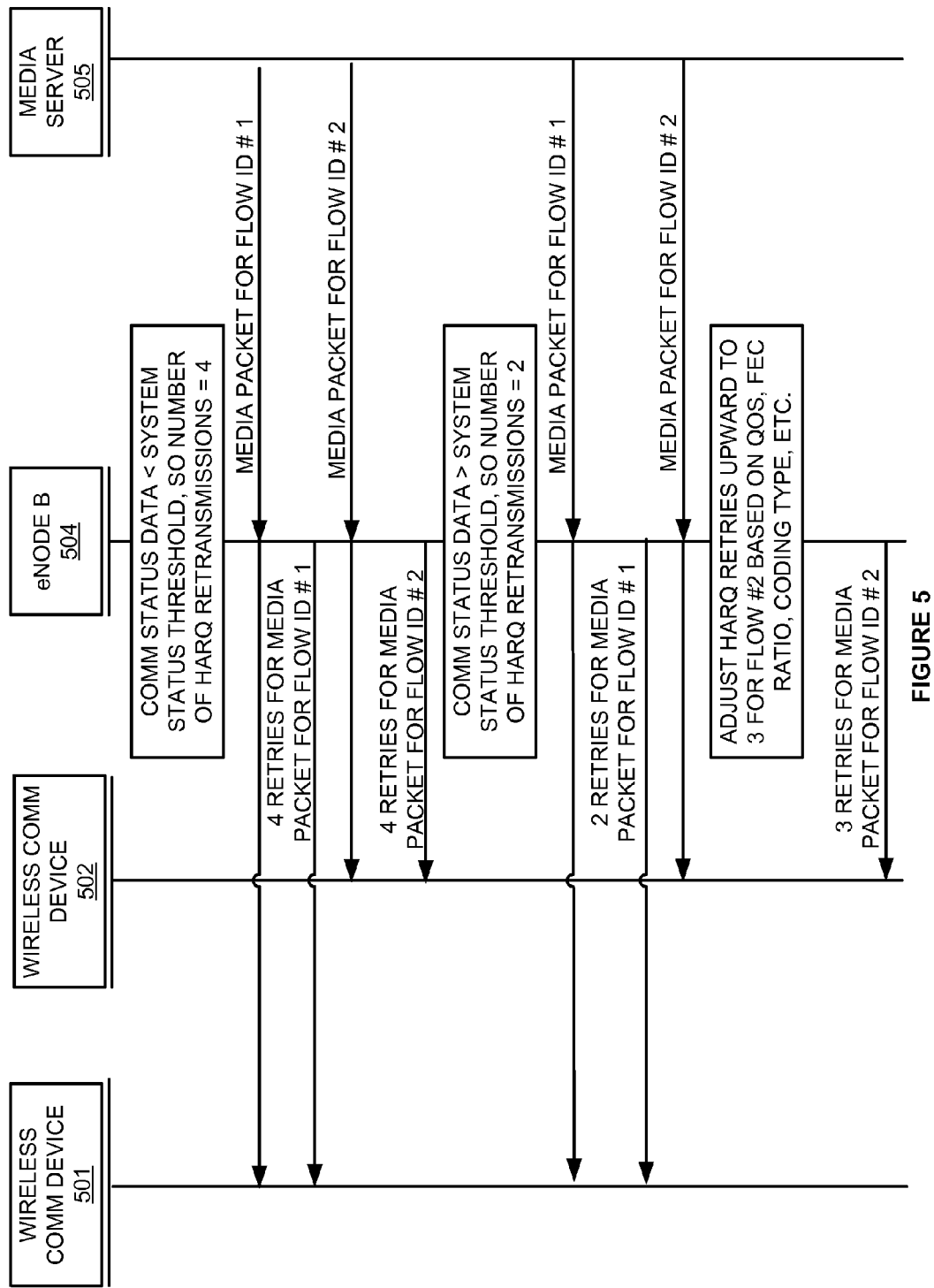
FIG. 5 illustrates the operation of a wireless communication system adjusting the number of HARQ retransmissions per media flow.

FIG. 5 is a sequence diagram that illustrates the operation of transferring media flows #1 and #2 to respective wireless communication devices 501 and 502. Media flows #1 and #2 comprise media content source packets and FEC packets. Initially the communication status data does not exceed the system status threshold, so eNodeB 504 sets the number of HARQ retransmissions to four for all users. Thus, when eNodeB 504 transfers a media packet to either wireless communication device 501 or 502, it will use up to four HARQ retries if negative ACKs are received for the packet.

Subsequently, the communication status data does exceed the system status threshold, so eNodeB 504 resets the number of HARQ retransmissions to two for most users. Thus, when eNodeB 504 transfers the next media packet to wireless communication device 501, it will use up to two HARQ retries if negative ACKs are received for the packet. Based on QoS, coding scheme, or n/L ratio, eNodeB 504 resets the number of HARQ retransmissions to three for flow #2. Thus, when eNodeB 504 transfers the next media packet to wireless communication device 502, it will use up to three HARQ retries if negative ACKs are received for the packet.

Figure 6:
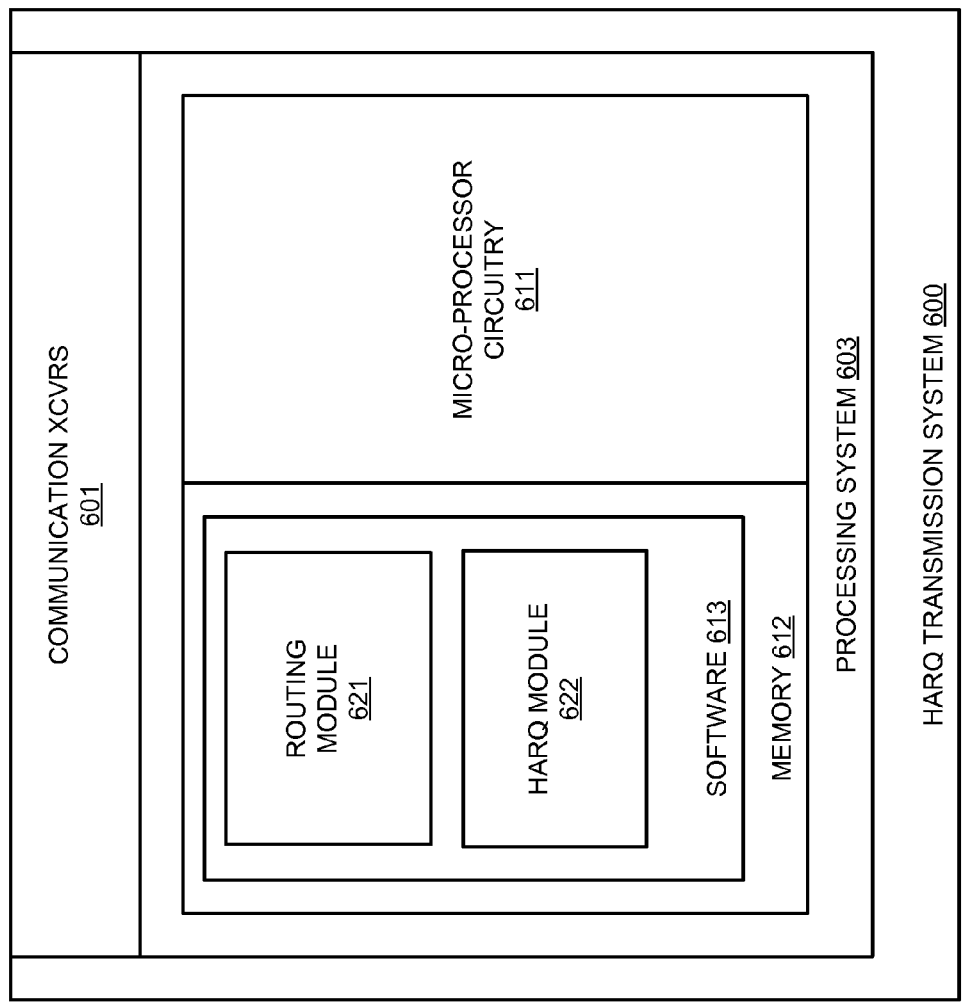
FIG. 6 illustrates an example of the HARQ transmission system shown in FIGS. 1, and 3-4.

FIG. 6 is a block diagram that illustrates a HARQ transmission system 600. HARQ transmission system 600 is an example of the HARQ transmission systems described above, although these systems may use alternative configurations and operations. HARQ transmission system 600 comprises communication transceiver 601 and processing system 603. Processing system 603 is linked to communication transceiver 601. Processing system 603 includes processing circuitry 611 and memory 612 that stores software 613. Software 613 comprises software modules 621-622.

Communication transceiver 601 comprises components that communicate over communication links such as network cards, ports, RF transceivers, processing circuitry and software, or some other communication components. Communication transceiver 601 may be configured to communicate over metallic, wireless, or optical links. Communication transceiver 601 may be configured to use Time-Division Multiplexing (TDM), Internet Protocol (IP), Ethernet, optical networking, wireless protocols, communication signaling, or some other communication format—including combinations thereof.

Processing circuitry 611 comprises microprocessor and other circuitry that retrieves and executes operating software 613 from memory 612. Processing circuitry 611 may comprise a single device or could be distributed across multiple devices—including devices in different geographic areas. Processing circuitry 611 may be embedded in various types of equipment. Examples of processing circuitry 611 include central processing units, application specific processors, and logic devices, and/or any other type of computer processing devices—including combinations thereof.

Memory 612 comprises a non-transitory computer readable storage medium readable by processing system 603 and capable of storing software 613, such as a disk drive, flash drive, data storage circuitry, or some other hardware memory apparatus—including combinations thereof. Memory 612 can include volatile and nonvolatile, removable and non-removable media implemented in any method or technology for storage of information, such as computer readable instructions, data structures, program modules, or other data—including combinations thereof. Memory system 612 may comprise a single device or could be distributed across multiple devices—including devices in different geographic areas. Memory system 612 may be embedded in various types of equipment. In some examples, a computer apparatus could comprise memory system 612 and software 613.

Software 613 comprises computer programs, firmware, or some other form of machine-readable processing instructions. Software 613 may include an operating system, utilities, drivers, network interfaces, applications, or some other type of software. In this example, software 613 comprises: routing module 621 and HARQ module 622, although software 613 could have alternative configurations in other examples.

Software 613 can be implemented in program instructions and can be executed by processing system 603. Software 613 can include additional processes, programs, or components, such as operating system software, database software, or application software—including combinations thereof. Software 613 can also comprise firmware or some other form of machine-readable processing instructions executable by processing system 603.

When executed, software 613 directs processing system 603 to operate as described herein. In particular, routing module 621 directs processing system 603 to transmit data packets to the requesting wireless communication device. HARQ module 622 implements HARQ using the specified number of retransmissions per flow ID.

FIG. 7 is a block diagram that illustrates a HARQ control system 700. HARQ control system 700 is an example of the HARQ control system described above, although these systems may use alternative configurations and operations. HARQ control system 700 comprises communication transceiver 701 and processing system 703. Processing system 703 is linked to communication transceiver 701. Processing system 703 includes processing circuitry 711 and memory 712 that stores software 713. Software 713 comprises software modules 721-722.

Communication transceiver 701 comprises components that communicate over communication links such as network cards, ports, RF transceivers, processing circuitry and software, or some other communication components. Communication transceiver 701 may be configured to communicate over metallic, wireless, or optical links. Communication transceiver 701 may be configured to use TDM, IP, Ethernet, optical networking, wireless protocols, communication signaling, or some other communication format—including combinations thereof.

Processing circuitry 711 comprises microprocessor and other circuitry that retrieves and executes operating software 713 from memory 712. Processing circuitry 711 may comprise a single device or could be distributed across multiple devices—including devices in different geographic areas.

Processing circuitry 711 may be embedded in various types of equipment. Examples of processing circuitry 711 include central processing units, application specific processors, and logic devices, and/or any other type of computer processing devices—including combinations thereof.

Memory 712 comprises a non-transitory computer readable storage medium readable by processing system 703 and capable of storing software 713, such as a disk drive, flash drive, data storage circuitry, or some other hardware memory apparatus—including combinations thereof. Memory 712 can include volatile and nonvolatile, removable and non-removable media implemented in any method or technology for storage of information, such as computer readable instructions, data structures, program modules, or other data—including combinations thereof. Memory 712 may comprise a single device or could be distributed across multiple devices—including devices in different geographic areas. Memory 712 may be embedded in various types of equipment. In some examples, a computer apparatus could comprise memory 712 and software 713.

Software 713 comprises computer programs, firmware, or some other form of machine-readable processing instructions. Software 713 may include an operating system, utilities, drivers, network interfaces, applications, or some other type of software. In this example, software 713 comprises: communication status module 721 and HARQ module 722, although software 713 could have alternative configurations in other examples.

Software 713 can be implemented in program instructions and can be executed by processing system 703. Software 713 can include additional processes, programs, or components, such as operating system software, database software, or application software—including combinations thereof. Software 713 can also comprise firmware or some other form of machine-readable processing instructions executable by processing system 703.

When executed software 713 directs processing system 703 to operate as described herein. In particular, communication status module 721 directs processing system 703 to determine whether the communication status data exceeds the system status threshold. If communication status exceeds the system status threshold, then HARQ module 722 adjusts the number of HARQ retransmission per flow ID as described herein.

Referring back to FIG. 1, wireless communication devices 101-103 comprise any device having wireless communication connectivity with hardware and circuitry programmed to function as a telecommunications device, such as Radio Frequency (RF) communication circuitry, an antenna, and software. The RF communication circuitry typically includes an amplifier, filter, modulator, and signal processing circuitry. Wireless communication devices 101-103 may also include a user interface, memory system, processing circuitry, or some other communication components. For example, wireless communication devices 101-103 could include telephones, mobile phones, cellular phones, smartphones, tablets, laptops, personal digital assistants (PDAs), computers, media players, eReaders, game consoles, televisions, mobile Internet devices, machine transceivers, and/or some other apparatus having wireless networking components.

Wireless communication devices 101-103 wirelessly communicate with wireless communication system 104 over communication links 111-113. Wireless network protocols that may be utilized by wireless communication devices 101-103 include Code Division Multiple Access (CDMA), Global System for Mobile communications (GSM), High-Speed Packet Access (HSPA), Evolution-Data Optimized (EVDO), Long Term Evolution (LTE), Worldwide Interoperability for Microwave Access (WiMAX), IEEE 802.11 protocols (WIFI), Bluetooth, or some other wireless network protocol.

HARQ transmission system 106 includes wireless access nodes that comprise RF communication circuitry and antenna systems. The RF communication circuitry typically includes amplifiers, filters, RF modulators, and signal processing circuitry. Wireless network protocols that may be utilized by the wireless access nodes include CDMA, GSM, HSPA, EVDO, LTE, WiMAX, WIFI, Bluetooth, or some other wireless communication format—including combinations thereof. HARQ transmission system 106 also comprises communication circuitry, software, and links that exchange communications between the wireless access nodes and external systems, such as media server 108. HARQ transmission system 106 typically includes components such as communication links, routers, gateways, servers, data storage systems, and power supplies.

HARQ control system 107 comprises a computer and communication system that determines whether to adjust the number of HARQ retransmissions in wireless communication system 104. HARQ control system 107 may also include other components such as a router, server, data storage system, and power supply. HARQ control system 107 may be a discrete system or may be integrated within other systems—including other systems within wireless communication environment 100. In some examples, HARQ control system 107 could be integrated within a packet data serving node, P-gateway, S-gateway, eNodeB, mobile switching center, or some other wireless network element.

Media server 108 comprises a computer system to transmit media streams using FEC, such as Raptor-Encoder, although other FEC schemes could be used. FEC encoder 109 comprises computer circuitry and software that generates FEC packets to be transmitted with media data packets.

Wireless communication links 111-113 use air or space as the transport medium. Wireless communication links 111-113 may use various protocols, such as CDMA, GSM, HSPA, EVDO, LTE, WiMax, WIFI, Bluetooth, or some other wireless communication format—including combinations thereof. Communication link 114 uses metal, air, space, glass, plastic, or some other transport material. Communication link 114 is representative and may include intermediate links, systems, and networks. Communication link 114 could use various communication protocols, such as TDM, IP, Ethernet, optical networking, hybrid fiber coax (HFC), communication signaling, wireless protocols, or some other communication format—including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:

receiving flow identifications (IDs) for media flows that traverse the wireless communication system and that use forward error correction (FEC) packets and a number of HARQ retransmissions per flow ID, in a first processor embedded with software instructions comprising a HARQ transmission system;

receiving the flow IDs, configuration data for the flow IDs, and communication status data for the wireless communication system, in a second processor embedded with software instructions comprising a HARQ control system;

determining if the communication status data exceeds a system status threshold, in the HARQ control system;

if the communication status data does not exceed the system status threshold, then maintaining the number of HARQ retransmissions per flow ID; and if the communication status data exceeds the system status threshold, then adjusting the number of HARQ retransmissions per flow ID; and in the HARQ transmission system using the number of HARQ retransmissions per flow ID.

2. The method of claim 1 wherein the FEC packets comprise repair packets.

3. The method of claim 1 wherein the FEC packets comprise Raptor-Encoder packets.

4. The method of claim 1 wherein the number of HARQ retransmissions per flow ID is initially set to a maximum number of allowed retransmissions.

5. The method of claim 1 wherein adjusting the number of HARQ retransmissions per flow ID comprises increasing the number of HARQ retransmissions per flow ID.

6. The method of claim 1 wherein the communication status data comprises a number of users served by a wireless access node.

7. The method of claim 1 wherein the communication status data comprises an amount of RF noise.

8. The method of claim 1 wherein the configuration data comprises quality of service values and wherein determining whether to adjust the number of HARQ retransmissions per flow ID comprises determining whether to adjust the number of HARQ retransmissions per flow ID based on the quality of service values.

9. The method of claim 1 wherein the configuration data comprises media coding types and wherein determining whether to adjust the number of HARQ retransmissions per flow ID comprises determining whether to adjust the number of HARQ retransmissions per flow ID based on the media coding types.

10. The method of claim 1 wherein the configuration data comprises repair packet-to-source packet ratios and wherein determining whether to adjust the number of HARQ retransmissions per flow ID comprises determining whether to adjust the number of HARQ retransmissions per flow ID based on the repair packet-to-source packet ratios.

11. A wireless communication system to optimize media services over a wireless network comprising:

a first processor embedded with software instructions comprising a HARQ transmission system configured to receive flow identifications (IDs) for media flows that traverse the wireless communication system and that use forward error correction (FEC) packets and a number of HARQ retransmissions per flow ID;

a second processor embedded with software instructions comprising a HARQ control system configured to receive the flow IDs, configuration data for the flow IDs, and communication status data for the wireless communication system and to determine if the communication status data exceeds a system status threshold;

if the communication status data does not exceed the system status threshold then the second processor comprising the HARQ control system is configured to maintain the number of HARQ retransmissions per flow ID and the first processor comprising the HARQ transmission system configured to use the number of HARQ retransmissions per flow ID; and if the communication status data exceeds the system status threshold then the second processor comprising the HARQ control system configured to adjust the number of HARQ retransmissions per flow ID and the first processor comprising the HARQ transmission system configured to use the adjusted number of HARQ retransmissions per flow ID.

12. The wireless communication system of claim 11 wherein the designated FEC packets comprise repair packets.

13. The wireless communication system of claim 11 wherein the FEC packets comprise Raptor-Encoder packets.

14. The wireless communication system of claim 11 wherein the number of HARQ retransmissions per flow ID is initially set to a maximum number of allowed retransmissions.

15. The wireless communication system of claim 11 wherein the HARQ control system is configured to increase the number of HARQ retransmissions per flow ID.

16. The wireless communication system of claim 11 wherein the communication status data comprises a number of users served by a wireless access node.

17. The wireless communication system of claim 11 wherein the communication status data comprises an amount of RF noise.

18. The wireless communication system of claim 11 wherein the HARQ control system is configured to receive quality of service values for the media flows, and to adjust the number of HARQ retransmissions per flow ID based on the quality of service values.

19. The wireless communication system of claim 11 wherein the HARQ control system is configured to receive media coding types for the media flows, and to adjust the number of HARQ retransmissions per flow ID based on the media coding types.

20. The wireless communication system of claim 11 wherein the HARQ control system is configured to receive repair packet-to-source packet ratios for the media flows, and to adjust the number of HARQ retransmissions per flow ID based on the repair packet-to-source packet ratios.

* * * * *